US007513244B2

(12) United States Patent
Potier

(10) Patent No.: US 7,513,244 B2
(45) Date of Patent: Apr. 7, 2009

(54) CANISTER HEATER

(75) Inventor: Vincent Potier, Brussels (BE)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 61 days.

(21) Appl. No.: 11/514,859

(22) Filed: Sep. 5, 2006

(65) Prior Publication Data

US 2007/0051345 A1 Mar. 8, 2007

(30) Foreign Application Priority Data

Sep. 5, 2005 (FR) .................................. 05 09062

(51) Int. Cl.
*F02M 33/02* (2006.01)
(52) U.S. Cl. ..................................... 123/519
(58) Field of Classification Search ................. 123/541, 123/520, 518, 519
See application file for complete search history.

(56) References Cited

U.S. PATENT DOCUMENTS

| 4,598,686 | A | * | 7/1986 | Lupoli et al. ................. 123/519 |
| 4,721,846 | A | | 1/1988 | Lupoli et al. |
| 4,864,103 | A | | 9/1989 | Bishop et al. |
| 6,043,468 | A | * | 3/2000 | Toya et al. ................... 219/544 |
| 6,136,170 | A | * | 10/2000 | Inoue et al. ................. 204/424 |
| 6,230,693 | B1 | * | 5/2001 | Meiller et al. ............... 123/519 |
| 6,689,196 | B2 | * | 2/2004 | Amano et al. ................. 96/112 |
| 7,156,156 | B2 | * | 1/2007 | Haller et al. .................. 165/10 |
| 2002/0148354 | A1 | * | 10/2002 | Amano et al. ................. 96/112 |
| 2002/0174857 | A1 | * | 11/2002 | Reddy et al. ................. 123/520 |
| 2004/0252986 | A1 | | 12/2004 | Ito et al. |
| 2005/0005918 | A1 | * | 1/2005 | Newhouse et al. .......... 123/549 |
| 2005/0109327 | A1 | * | 5/2005 | Reddy ........................ 123/519 |
| 2006/0174857 | A1 | | 8/2006 | Potier |

FOREIGN PATENT DOCUMENTS

| CA | 1271797 | 7/1990 |
| FR | 2880233 | 6/2006 |
| JP | 1-147154 | 6/1989 |
| WO | WO 2005/113278 | 12/2005 |
| WO | WO 2006/008301 | 1/2006 |

* cited by examiner

*Primary Examiner*—Stephen K Cronin
*Assistant Examiner*—Arnold Castro
(74) *Attorney, Agent, or Firm*—Oblon, Spivak, McClelland, Maier & Neustadt, P.C.

(57) ABSTRACT

A heater for heating a fluid intended to pass through a fuel tank canister is provided. The heater includes a casing provided with a coupler for coupling to the canisters, at least two plates placed inside the casing in substantially parallel planes, and at least one heating element housed between the plates. The at least two plates are place inside the casing such that the fluid flows between the two plates. The coupler is placed in a plane substantially parallel to at least one plane of one of the plates and the projected area of the coupler on the plane of one of the plates lies substantially within the projected area of the casing on the plane.

16 Claims, 5 Drawing Sheets

CANISTER HEATER

BACKGROUND OF THE INVENTION

1. Field of the Invention

The present invention relates to a heater for heating a fluid intended to pass through a fuel tank canister.

2. Description of the Related Art

Fuel vapours escaping from a fuel system are a source of hydrocarbon emissions in motor vehicles. Fuel leaks due to lack of sealing and also losses by evaporation are most particularly the subject of increasingly stringent regulations, especially for applications in motor vehicles.

Now, fuel tanks, in particular for motor vehicles, usually have a venting orifice for balancing the internal pressure with the atmospheric pressure, for example during variations in the fuel level resulting from filling the tank or from the consumption of fuel by the engine, or else during variations in temperature. Therefore, to meet the aforementioned standards, this venting orifice is conventionally connected to atmosphere via a duct and a chamber, usually called a canister, which contains a substance that adsorbs the fuel vapours, this usually being activated charcoal. The role of the canister is to prevent the release of fuel vapours into the atmosphere. The canister is regularly purged, i.e. the vapours are desorbed, generally by means of a stream of air, and sent to the air intake system of the engine in order for them to be burnt therein.

A major problem with systems for controlling evaporative loss using activated charcoal as adsorbent material in the canister is that, under low ambient temperature conditions, it is difficult for the fuel that has been adsorbed to be released and purged from the canister. It has been determined that, with the adsorbents currently used, satisfactory release of the stored fuel occurs at the ambient temperature or above it. When the temperatures drop well below the ambient temperature, the effectiveness of the system is significantly impaired. It is therefore advantageous to increase the temperature inside the canister. The improvement in desorption has the consequence that the adsorbent is more active, as it has been better desorbed.

Heaters located outside the canister for heating the adsorbent, are known from the prior art. Document U.S. Pat. No. 6,230,693 discloses an auxiliary canister designed to be connected to the vent of a main canister, said auxiliary canister containing, like the main canister, an adsorbent material. This auxiliary canister includes a heater consisting, for example, either of a PTC (Positive Temperature Coefficient) ceramic extruded in the form of a honeycomb, or of aluminium fins attached to a bar made of PTC-type ceramic. Such a canister has the drawback of heating the adsorbent and not the air flowing when the main canister is being purged and, in addition, the drawback of introducing additional pressure drops in the flow of purge air.

Also known, as described in Patent CA 1271797, is a heater that is fixed to a canister and in which the air passes around heated plates. The heater is fixed to the canister so as to close off one end of the latter. The geometry of the heater depends closely on that of the canister and cannot be standardized so as to be fitted to canisters of various geometries.

SUMMARY OF THE INVENTION

To alleviate the abovementioned drawbacks, the object of the present invention is therefore to provide a heater for heating the purge air before it passes through the canister, while still introducing no or little additional pressure drop and offering a geometry that ensures the heater can be used on canisters with different geometries.

The heater also makes it possible to add an additional functionality—the heating of the purge air—to a standard canister that does not possess this functionality.

For this purpose, the present invention relates to a heater for heating a fluid intended to pass through a fuel tank canister, comprising:

- a casing provided with a coupler for coupling to the canister;
- at least two plates placed inside the casing in substantially parallel planes, through which plates the fluid flows; and
- at least one heating element housed between said plates, the coupler being placed in a plane substantially parallel to at least one plane of one of the plates and the projected area of the coupler on said plane of one of the plates lying substantially within the projected area of the casing on said plane.

The heater according to the invention is an independent component, intended to heat the purge air that flows towards a canister, which heater is connected to said canister. It comprises a casing made of one or more parts joined together, for example by welding, and provided with a coupler for coupling to the canister.

The shape and the dimensions of the coupler are generally defined in such a way that the connection of the heater to the canister requires no particular modification to the canister. However, an intermediate component may be placed between the outlet coupler of the heater and the venting outlet of the canister.

The heater according to the invention has the advantage of being a standard component, which can be fitted to a canister of any geometry.

Preferably, the casing is made of a material having a thermal resistance matched to the temperatures of the fluid that can pass through the heater. This material may be a plastic or a metal.

The casing is preferably made of a thermoplastic. Thermoplastics give good results within the context of the invention.

The term "thermoplastic" is understood to mean any thermoplastic polymer, including thermoplastic elastomers, as well as blends thereof. The term "polymer" is understood to mean both homopolymers and copolymers (especially binary or ternary copolymers). Examples of such copolymers are, non-limitingly, random copolymers, linear block copolymers, other block copolymers, and graft copolymers.

Any type of thermoplastic polymer or copolymer, the melting point of which is below the decomposition temperature, is suitable. Thermoplastics having a melting range spread over at least 10 degrees Celsius are particularly suitable. Examples of such materials include those that exhibit polydispersion in their molecular weight.

It is possible to use polyamides and their copolymers, preferred for their heat resistance. A polymer blend or copolymer blend may also be used, as may be a blend of polymeric materials with inorganic, organic and/or natural fillers such as, for example, but not limitingly, carbon, salts and other inorganic derivatives, natural fibres, glass fibres and polymeric fibres. It is also possible to use multilayer structures consisting of stacked layers bonded together, comprising at least one of the polymers or copolymers described above.

According to the invention, the purge air flows between at least two plates placed inside the casing in substantially parallel planes. Preferably, a suitable distance is maintained between the plates so as to avoid any electrical short circuit between them. The distance between the plates is in general not less than 0.5 mm and preferably not less than 1 mm. It is in general not more than 10 mm and preferably not more than 8 mm.

Preferably, the plates act both as fins, for dissipating the heat released into the air by heating elements placed between these plates, and as electrical contacts, for supplying the electrical current to the heating elements.

Preferably, the plates are made of a metallic material.

More preferably, the plates are made of aluminium.

Plates with a thickness of at least 0.1 mm, preferably at least 0.2 mm, have given good results.

Plates having a thickness of at most 0.5 mm, preferably at most 0.3 mm, have also given good results.

The heating elements may be resistance heating elements, the material and the cross section of which are determined according to the application, i.e. in general according to the amount of heat that it is desired to release into the air. The heating elements are preferably supplied with voltage (for example a voltage of 12 volts) via an electrical relay.

The heating elements may be characterized, for example, by their heating dynamics, i.e. the temperature increment obtained in a given time. Heating elements able, for example, to increase the temperature from 20 to 70 degrees Celsius in less than 60 seconds have given good results.

The heating elements are preferably resistance heating elements, in particular of the PTC type. They consist of ceramic blocks, the electrical resistance of which suddenly increases at a given temperature. This has the effect of limiting the electrical current flowing in the resistance elements, and therefore of preventing overheating.

According to the invention, the coupler for coupling to the canister is placed in a plane substantially parallel to at least one plane of one of the plates and the projected area of the coupler on said plane of one of the plates lies substantially within the projected area of the casing on said plane.

The expression "projected area" is understood to mean the area obtained by the orthogonal projection of an object on a given plane.

The canister to which the heater according to the invention is connected is particularly intended for internal combustion engines supplied with volatile liquid fuels, and in particular for the engines of motor vehicles (cars, lorries, motorcycles, etc.).

The term "fuel" is understood to mean a gaseous or volatile liquid hydrocarbon suitable for supplying internal combustion engines. The canister according to the invention is particularly suitable for volatile liquid hydrocarbons. The expression "volatile liquid hydrocarbon" is understood to mean a liquid hydrocarbon (which, under normal operating conditions of the engine, is in the liquid state in the fuel tank of the fuel system) that has a saturation vapour pressure above 1 bar at 293 K (20° C.). Volatile liquid hydrocarbons commonly used for supplying internal combustion engines of motor vehicles are those sold commercially as "petrol" and intended for spark-ignition internal combustion engines.

Preferably, the heater includes an electronic controller. This controls the operation of the heating elements, in particular the heating power needed to achieve a given maximum temperature in a given time (see above). The casing may therefore include electrical connectors that are used inter alia to supply the electronic controller.

The controller is housed inside the casing of the heater in a part where the air flows before passing between the plates, i.e. the air at ambient temperature. The flow of this air allows the heat radiated by the operating controller to be removed.

Preferably, the heater further includes a spacer housed in the casing and at least partly separating the electronic controller from the plates. The spacer makes it possible to protect the controller from the heat radiated by the plates. It is generally provided with ribs which locally reinforce the spacer and give it the strength needed to resist any load to which it is subjected inside the casing.

In general, the housing is provided with two couplers, one of which corresponds to an inlet and the other to an outlet during flow of the purge air. The casing is therefore generally connected to the canister so that the outlet coupler is connected to the venting outlet of the canister.

Preferably, the second coupler is also placed in a plane substantially parallel to at least one plane of one of the plates and the projected area of the second coupler on said plane of one of the plates lies substantially within the projected area of the casing on said plane. In this embodiment, the fluid preferably flows from the second coupler to the first coupler.

In one particular embodiment, the casing of the heater has an appropriate profile—in general it comprises a part in the form of a diffuser—for distributing the fluid flowing from the second coupler to the first coupler over at least one of the plates.

The invention also relates to a canister connected to a heater as described above.

Preferably, the canister is connected to the heater in such a way that one coupler of the casing cooperates with a venting outlet of the canister.

The invention also relates to a fuel system comprising a fuel tank and a canister as described above.

Preferably, the fuel system comprises a fuel leak detector (for example of the OBD type) which is connected to the second coupler of the heater.

The present invention will be illustrated in a non-limiting manner by FIGS. 1 to 9, which show advantageous embodiments of the device according to the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
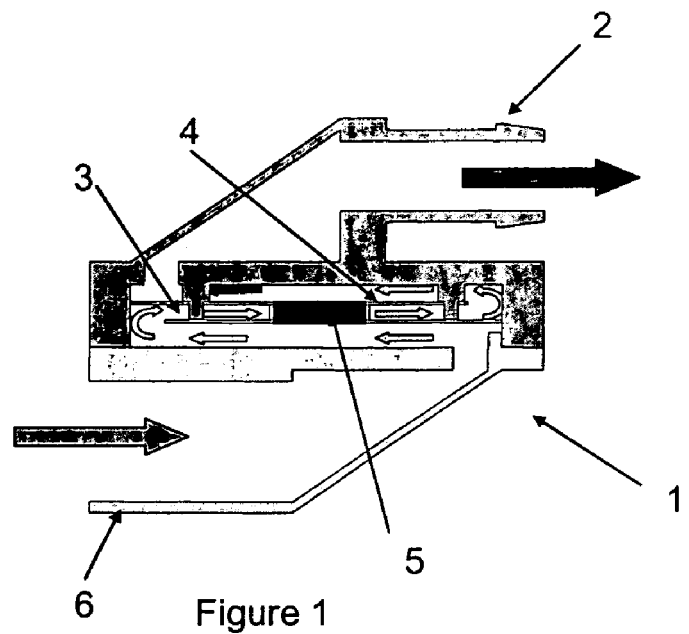
FIG. 1 illustrates a cut-away view of a heater according to an exemplary aspect.

Referring now to the drawings, wherein like reference numerals designate identical or corresponding parts throughout the several views.

FIG. 1 illustrates schematically a heater comprising a casing (1) provided with two couplers (2) and (6), the coupler (2) of which is intended to be connected to the venting outlet of a canister and the coupler (6) is intended to be connected to an OBD device. The purge air flows through the heater, between the plates (3) and (4), in the direction of flow indicated by the arrows. A heating element (5) is inserted between the plates (3) and (4).

FIGS. 2 to 6 show various views of one possible embodiment of the heater according to the invention.

Figure 2:
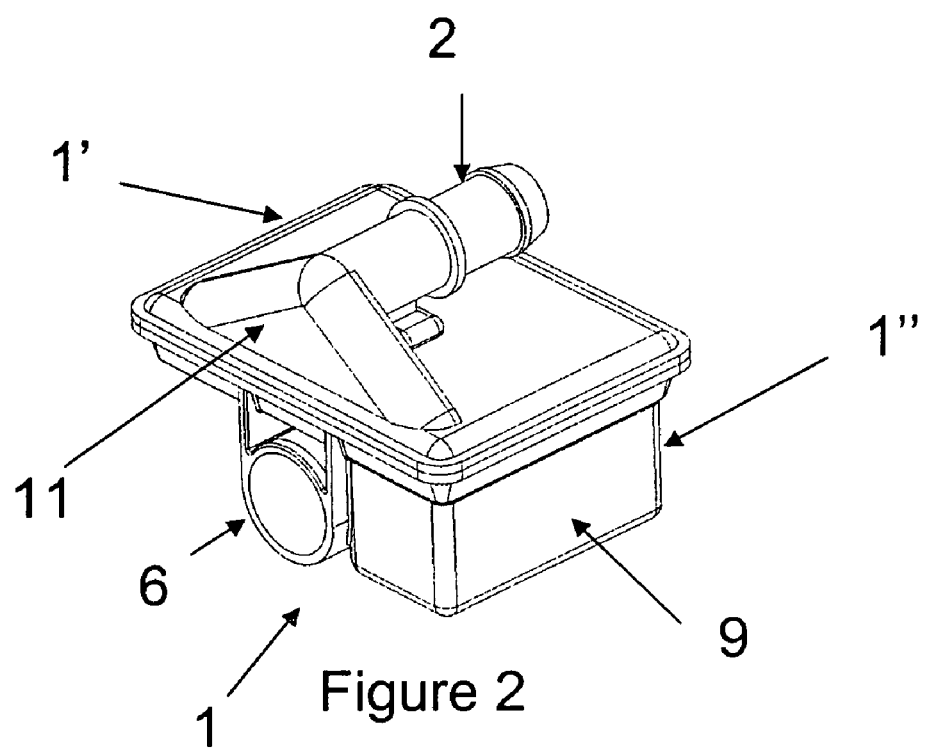
FIG. 2 is a perspective view that illustrates the heater of the exemplary aspect.

The casing (1) in FIG. 2 comprises two parts (1') and (1") that are provided with respective couplers (2) and (6). Furthermore, the part (1") of the casing (1) includes a housing (9) for an electronic controller (not shown).

Figure 3:
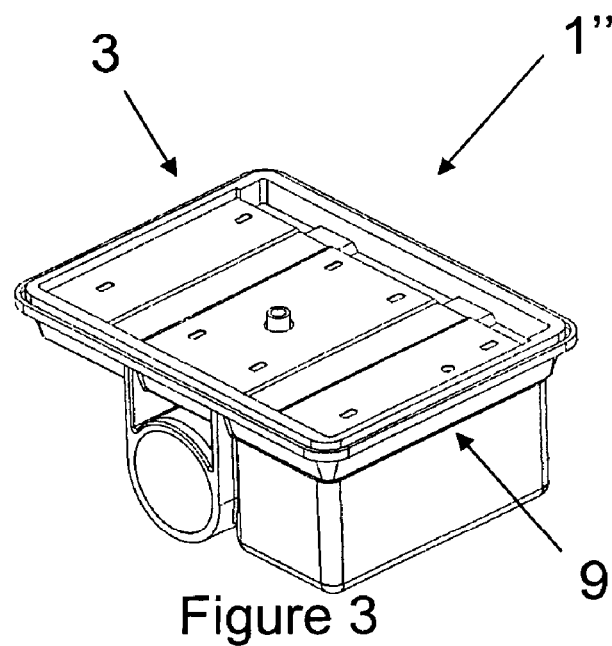
FIG. 3 is a perspective view that illustrates the heater of the exemplary aspect with a first part omitted.

In FIG. 3, the part (1') has been omitted so as to show only the part (1") of the casing (1). A metal plate (3) may be seen.

Figure 4:
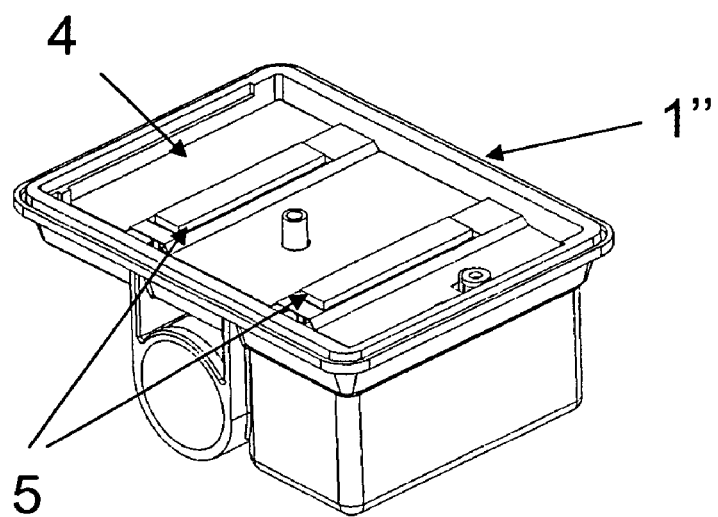
FIG. 4 is a perspective view that illustrates the heater of the exemplary aspect with the first part and a first plate part omitted.

FIG. 4 corresponds to what is shown in FIG. 3 when the metal plate (3) has been removed. Two heating elements (5) have been shown in the figure, these being housed on a plate (4) located beneath the plate (3).

Figure 5:
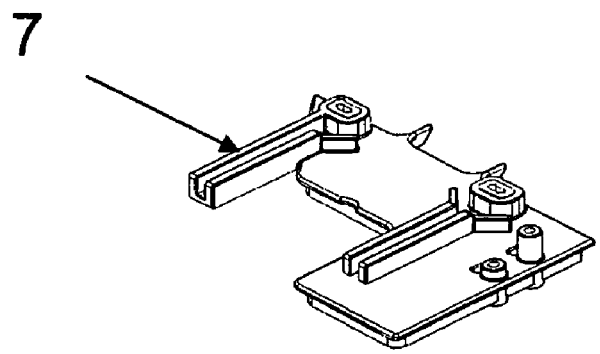
FIG. 5 is a perspective view that illustrates a spacer of the exemplary aspect.
Figure 6:
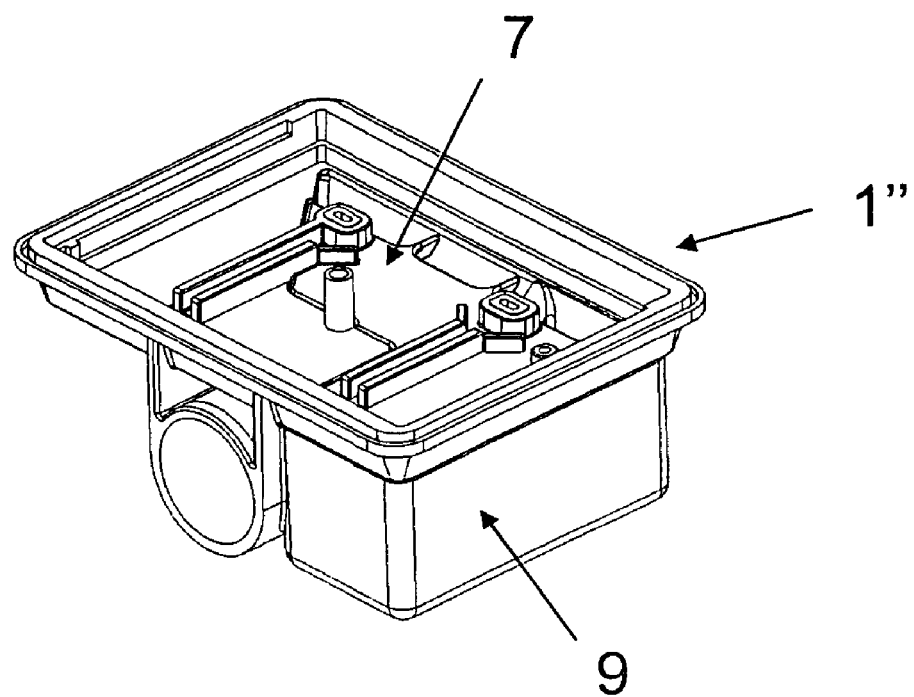
FIG. 6 is a perspective view that illustrates the heater of the exemplary aspect with the first part, the first plate part, and a second plate part omitted.

The spacer (7) illustrated in FIGS. 5 and 6 (the metal plate (4) visible in FIG. 4 has been removed) makes it possible to separate the electronic controller, housed in the part (9) of the casing (1), from the plate (4), which is not shown in FIG. 6.

Figure 7:
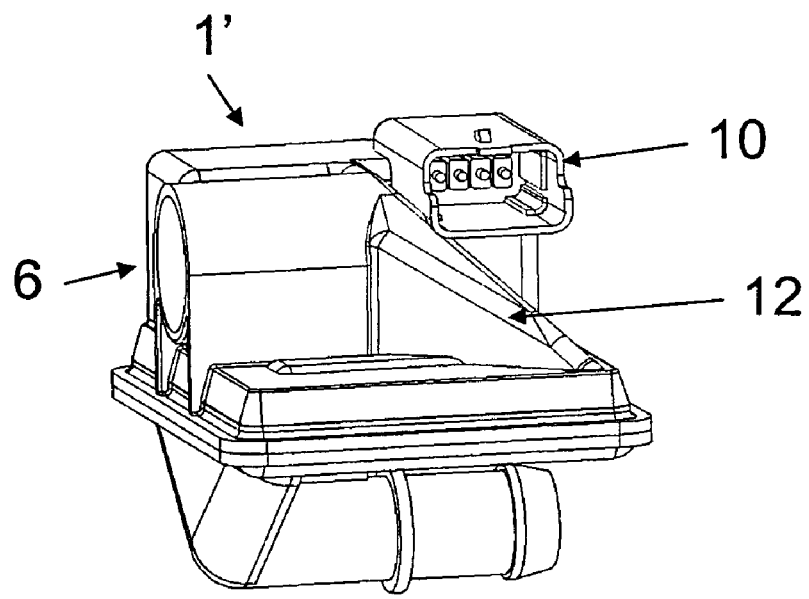
FIG. 7 is a perspective view that illustrates the heater of the exemplary aspect.

FIG. 7 also shows an electrical connector (10) located in the part (1") of the casing (1), which connector serves inter alia for supplying the electronic controller. A diffuser (12) allows the air entering via the coupler (6) and intended to flow through the heater to be distributed.

Figure 8:
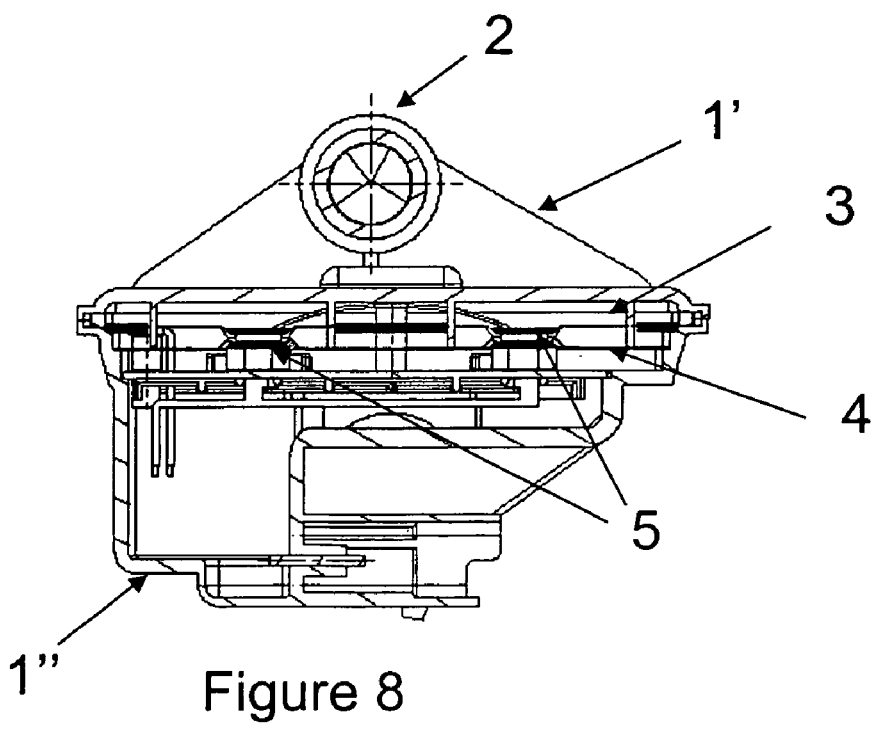
FIG. 8 illustrates a cut-away view of the heater according to the exemplary aspect.

FIG. 8 illustrates a cross section of the heater of FIG. 7, orthogonal to the coupler (2). Two heating elements (5) are sandwiched between the metal plates (3) and (4).

Figure 9:
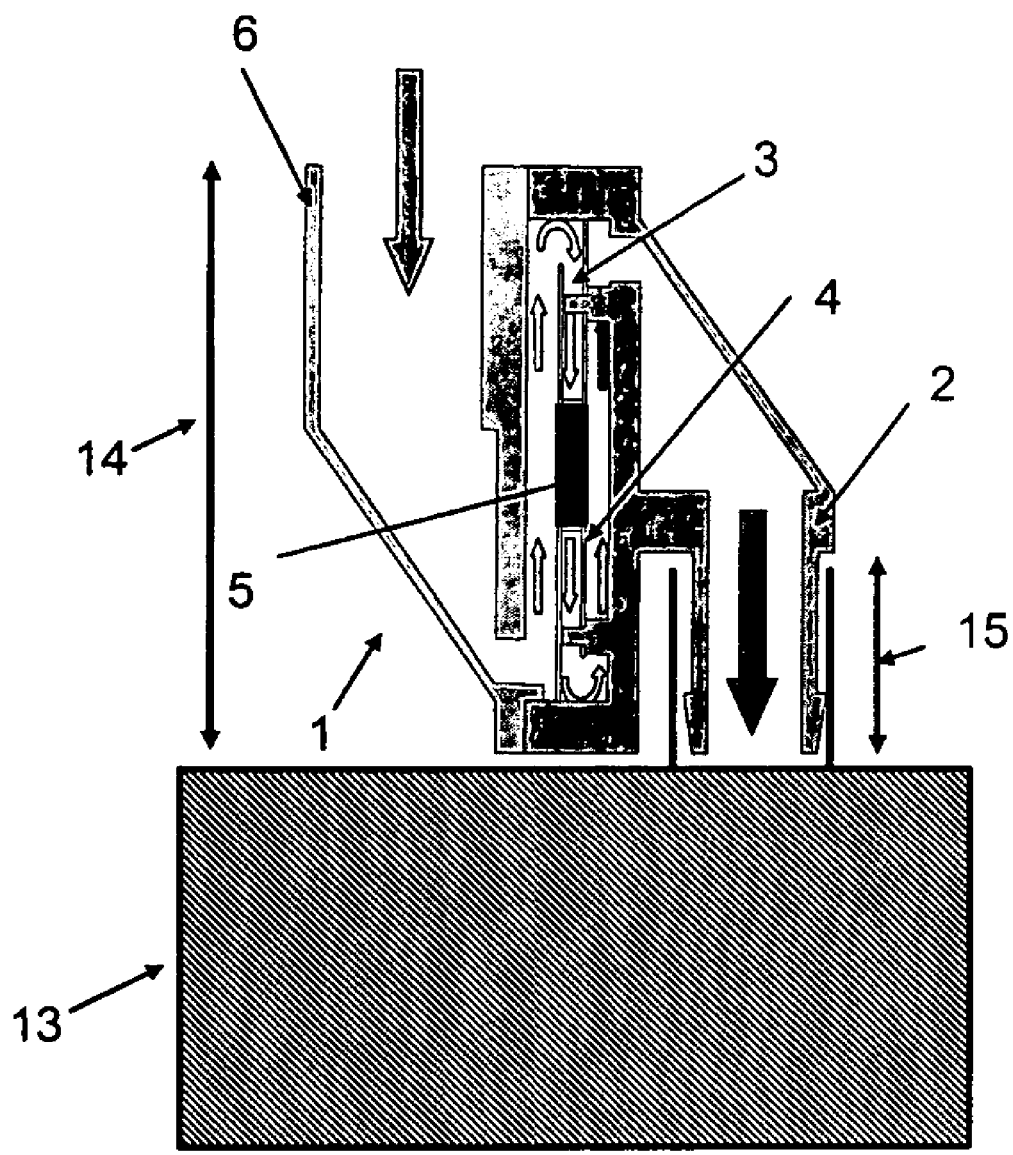
FIG. 9 illustrates a connection between a canister and the heater of the exemplary aspect.

FIG. 9 shows the connection of the heater to a canister (13). It may be seen that the first coupler (2) is inserted into a coupler on the canister, corresponding to a venting outlet of the latter. The extent of the coupler (2) does not exceed the extent of the casing (1) in the direction of the arrow (14). In other words, the projected area of the coupler (2) on one of the planes of one of the plates (3) or (4) lies within the projected area of the casing (1) on the same plane.

The invention claimed is:

1. A heater for heating a fluid intended to pass through a fuel tank canister, comprising:
   a casing provided with a coupler for coupling to the canister;
   at least two plates placed inside the casing in substantially parallel planes, between which plates the fluid flows; and
   at least one heating element housed between said plates, the coupler being placed in a plane substantially parallel to at least one plane of one of the plates and the projected area of the coupler on said plane of one of the plates lying substantially within the projected area of the casing on said plane,
   wherein the at least two plates are arranged in said casing so as to form a serpentine flow path for the fluid.

2. The heater according to claim 1, wherein the casing is made of a thermoplastic chosen from polyamides or their copolymers.

3. The heater according to claim 1, wherein the plates are made of a metallic material.

4. The heater according to claim 1, wherein the heating element is a resistance heating element.

5. The heater according to claim 1, further comprising an electronic controller.

6. The heater according to claim 5, further comprising a spacer housed in the casing and at least partly separating the electronic controller from the plates.

7. The heater according to claim 1, further comprising a second coupler, also placed in a plane substantially parallel to at least one plane of the plates, and the projected area of the coupler on said plane of one of the plates lies substantially within the projected area of the casing on said plane.

8. The heater according to claim 7, wherein the casing has a profile suitable for distributing the fluid flowing from the second coupler to the first coupler over at least one of the plates.

9. A fuel tank canister having a venting outlet connected to the coupler of a heater according to claim 1.

10. A fuel system comprising a fuel tank and a canister according to claim 9.

11. The heater according to claim 1, wherein the serpentine flow path extends below a first one of the at least two plates, extends between the first one of the at least two plates and a second one of the at least two plates, and extends above the second one of the at least two plates.

12. A heater for heating a fluid intended to pass through a fuel tank canister, comprising:
   a casing provided with a coupler for coupling to the canister;
   at least two plates placed inside the casing in substantially parallel planes, between which plates the fluid flows; and
   at least one heating element housed between said plates, the coupler being placed in a plane substantially parallel to at least one plane of one of the plates and the projected area of the coupler on said plane of one of the plates lying substantially within the projected area of the casing on said plane,
   wherein the at least one heating element is sandwiched between the at least two plates such that a top portion of the at least one heating element contacts an interior surface of a first one of the at least two plates and a bottom portion of the at least one heating element contacts an interior surface of a second one of the at least two plates, and wherein the interior surface of the first one of the at least two plates faces the interior surface of the second one of the at least two plates.

13. A heater for heating a fluid intended to pass through a fuel tank canister, comprising:
   a casing provided with a coupler for coupling to the canister;
   at least two plates placed inside the casing in substantially parallel planes, between which plates the fluid flows; and
   at least one heating element housed between said plates, the coupler being placed in a plane substantially parallel to at least one plane of one of the plates and the projected area of the coupler on said plane of one of the plates lying substantially within the projected area of the casing on said plane,
   wherein the at least two plates includes a first plate and a second plate, and wherein the casing includes a continuous flow passage that includes a first portion that extends below the first plate, a second portion that extends between the first plate and the second plate, and a third portion that extends above the second plate.

14. The heater according to claim 13, wherein the at least one heating element includes a first heating element and a second heating element, and wherein said second portion of said continuous flow passage extends between said first heating element and said second heating element.

15. A heater for heating a fluid intended to pass through a fuel tank canister, comprising:
 a casing provided with a coupler for coupling to the canister;
 at least two plates placed inside the casing in substantially parallel planes, between which plates the fluid flows; and
 at least one heating element housed between said plates, the coupler being placed in a plane substantially parallel to at least one plane of one of the plates and the projected area of the coupler on said plane of one of the plates lying substantially within the projected area of the casing on said plane,
 wherein the at least two plates includes a first plate and a second plate, and wherein the first plate and the second plate are arranged in the casing so as to be offset with respect to each other in a first direction that is substantially parallel to the substantially parallel planes, and
 offset with respect to each other in a second direction that is substantially perpendicular to the substantially parallel planes, and
 wherein the arrangement of the first and second plates in the casing creates a serpentine flow path.

16. A heater for heating a fluid intended to pass through a fuel tank canister, comprising:
 a casing provided with a coupler for coupling to the canister;
 at least two plates placed inside the casing in substantially parallel planes, between which plates the fluid flows;
 at least one heating element housed between said plates, the coupler being placed in a plane substantially parallel to at least one plane of one of the plates and the projected area of the coupler on said plane of one of the plates lying substantially within the projected area of the casing on said plane;
 an electronic controller; and
 a spacer housed in the casing and at least partly separating the electronic controller from the plates.

* * * * *

UNITED STATES PATENT AND TRADEMARK OFFICE
CERTIFICATE OF CORRECTION

PATENT NO. : 7,513,244 B2 Page 1 of 1
APPLICATION NO. : 11/514859
DATED : April 7, 2009
INVENTOR(S) : Vincent Potier It is certified that error appears in the above-identified patent and that said Letters Patent is hereby corrected as shown below:

Title page, Item (57), line 3 of the Abstract, please change "canisters" to --canister--.

Signed and Sealed this

Twenty-eighth Day of July, 2009

JOHN DOLL
*Acting Director of the United States Patent and Trademark Office*